United States Patent
Keefer

(10) Patent No.: US 9,834,394 B2
(45) Date of Patent: Dec. 5, 2017

(54) SPRAY BAR DEFLECTION TRAY

(71) Applicant: Ronald Keefer, Canton, OH (US)

(72) Inventor: Ronald Keefer, Canton, OH (US)

(73) Assignee: Midwest Industrial Supply, Inc., Canton, OH (US)

( * ) Notice: Subject to any disclaimer, the term of this patent is extended or adjusted under 35 U.S.C. 154(b) by 0 days.

(21) Appl. No.: 14/993,866

(22) Filed: Jan. 12, 2016

(65) Prior Publication Data
US 2016/0221769 A1  Aug. 4, 2016

Related U.S. Application Data

(60) Provisional application No. 62/164,848, filed on May 21, 2015, provisional application No. 62/102,336, filed on Jan. 12, 2015.

(51) Int. Cl.
*B05B 15/04* (2006.01)
*B65G 69/18* (2006.01)
(Continued)

(52) U.S. Cl.
CPC ............ *B65G 69/188* (2013.01); *B05B 1/044* (2013.01); *B05B 1/20* (2013.01); *B05B 1/267* (2013.01); *B05B 15/04* (2013.01); *B05B 15/0406* (2013.01); *E04D 13/076* (2013.01); *E04D 13/0725* (2013.01); *F25D 21/14* (2013.01)

(58) Field of Classification Search
CPC ............. A01K 39/014; B05B 15/0406; B05B 15/0425; E04D 2013/0481; E04D 2013/0486; E04D 13/0725; E04D 13/076; F25D 2321/144; F25D 2321/146; F25D 2321/1441; F25D 2321/1442
USPC ............... 239/193, 120–122; 119/61.2, 61.3; 222/108, 109, 111; 220/571, 572, 573; 137/312, 314; 52/11–16; 62/285, 288, 62/289, 291; 165/70, DIG. 195; 248/48.1, 48.2
See application file for complete search history.

(56) References Cited

U.S. PATENT DOCUMENTS 4,183,368 A * 1/1980 Husted .................. E04D 13/076
  134/166 R
4,616,450 A * 10/1986 Shouse ................. E04D 13/076
  52/12

(Continued)

FOREIGN PATENT DOCUMENTS

CN    103 736 618    4/2014

*Primary Examiner* — Alexander Valvis
(74) *Attorney, Agent, or Firm* — Emerson Thomson Bennett, LLC; Daniel A. Thomson

(57) ABSTRACT

A spray trough is described herein, including a trough body, wherein the trough body has a bottom portion, a first side portion, a second side portion, a front portion, and a back portion, the bottom portion, the front portion, and the back portion each having a first end and a second end, a top plate having a first end and a second end, wherein the first end of the top plate is fixedly attached to the second end of the back portion, wherein the top plate extends substantially perpendicular from the second end of the back portion, and a deflector plate, wherein the deflector plate is attached to the second end of the front plate, wherein the deflector plate extends downwardly from the second end of the front plate, such that the deflector plate angles towards the front portion.

10 Claims, 6 Drawing Sheets

(51) Int. Cl.
*B05B 1/20* (2006.01)
*B05B 1/26* (2006.01)
*E04D 13/072* (2006.01)
*B05B 1/04* (2006.01)
*E04D 13/076* (2006.01)
F25D 21/14 (2006.01)

(56) References Cited

U.S. PATENT DOCUMENTS

| | | | | |
|---|---|---|---|---|
| 5,115,974 A | * | 5/1992 | Tobias | B05B 17/085 |
| | | | | 239/193 |
| 5,471,798 A | * | 12/1995 | Kuhns | E04D 13/076 |
| | | | | 52/11 |
| 5,799,445 A | * | 9/1998 | Kock | E04D 13/0645 |
| | | | | 52/11 |
| 5,799,905 A | * | 9/1998 | Rokita | E04D 13/0725 |
| | | | | 248/48.2 |
| 6,926,210 B2 | * | 8/2005 | Baxter | E04D 13/0765 |
| | | | | 239/208 |
| 7,188,784 B1 | * | 3/2007 | Mullins | B05B 12/04 |
| | | | | 134/166 R |
| 7,340,913 B2 | * | 3/2008 | Miller | F25C 1/225 |
| | | | | 239/193 |

\* cited by examiner

SPRAY BAR DEFLECTION TRAY

This application claims priority to U.S. Ser. No. 62/102,336, filed Jan. 12, 2015 and U.S. Ser. No. 62/164,848, filed May 21, 2015, both of which are incorporated herein by reference. This invention generally relates to methods and apparatuses for dust suppression for railroad cars, and more particularly to a deflection tray for a spray bar.

I. BACKGROUND

A. Field
B. Description of the Related Art
Currently, the contents of rail cars are sprayed from straight arms. Spray bars are typically attached to a trim chute via a permanent bracket. The spray from the nozzles creates spray and foam when sprayed into a trough, when not in use.

II. SUMMARY

The present teaching provides a deflection tray for a spray bar for more efficiently spraying contents of rail cars, and for reducing waste and foaming during application.

Other benefits and advantages will become apparent to those skilled in the art to which it pertains upon reading and understanding of the following detailed specification.

III. BRIEF DESCRIPTION OF THE DRAWINGS

Example arrangements are described hereinafter with reference to the accompanying drawings.

Figure 1:
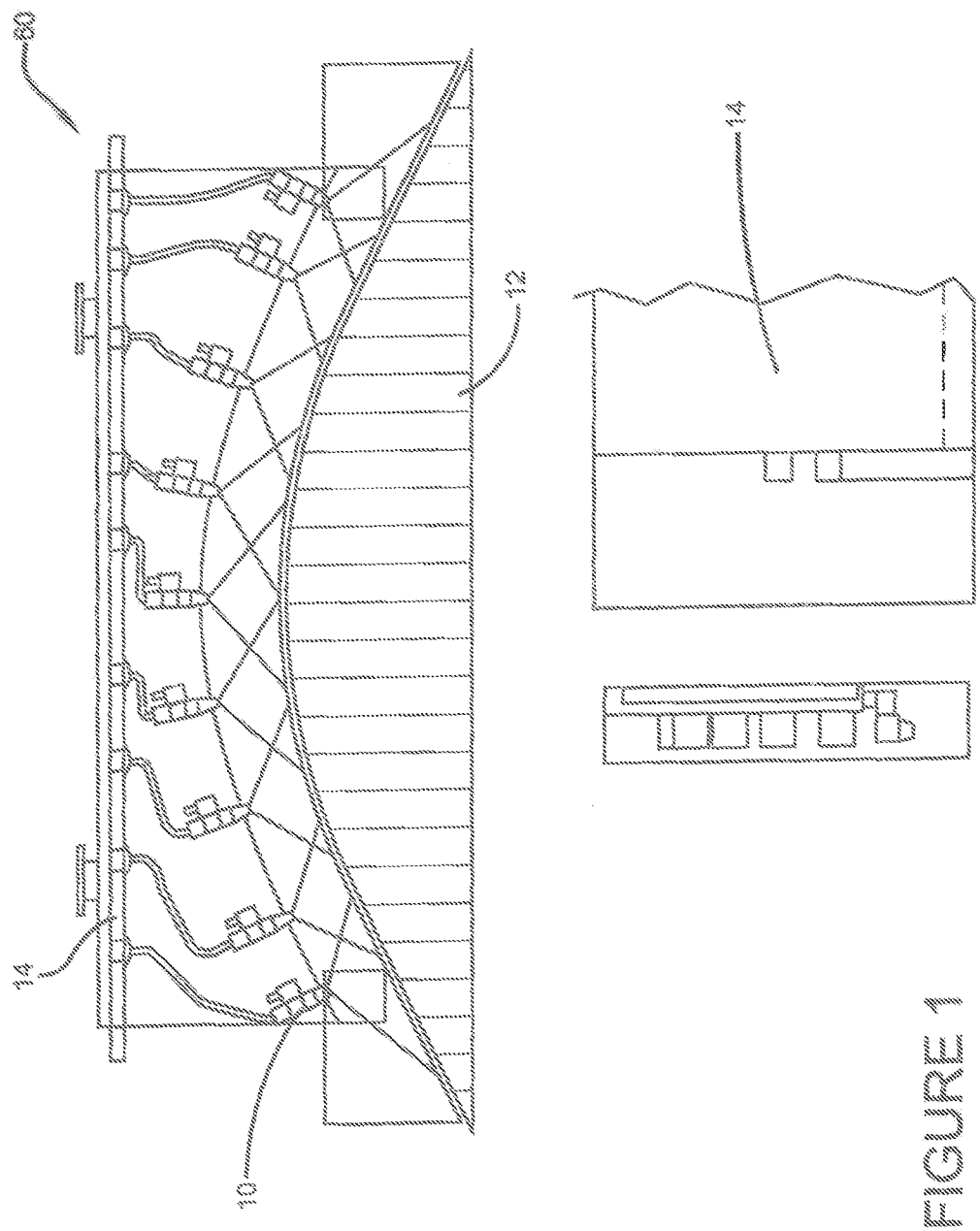
Figure 2:
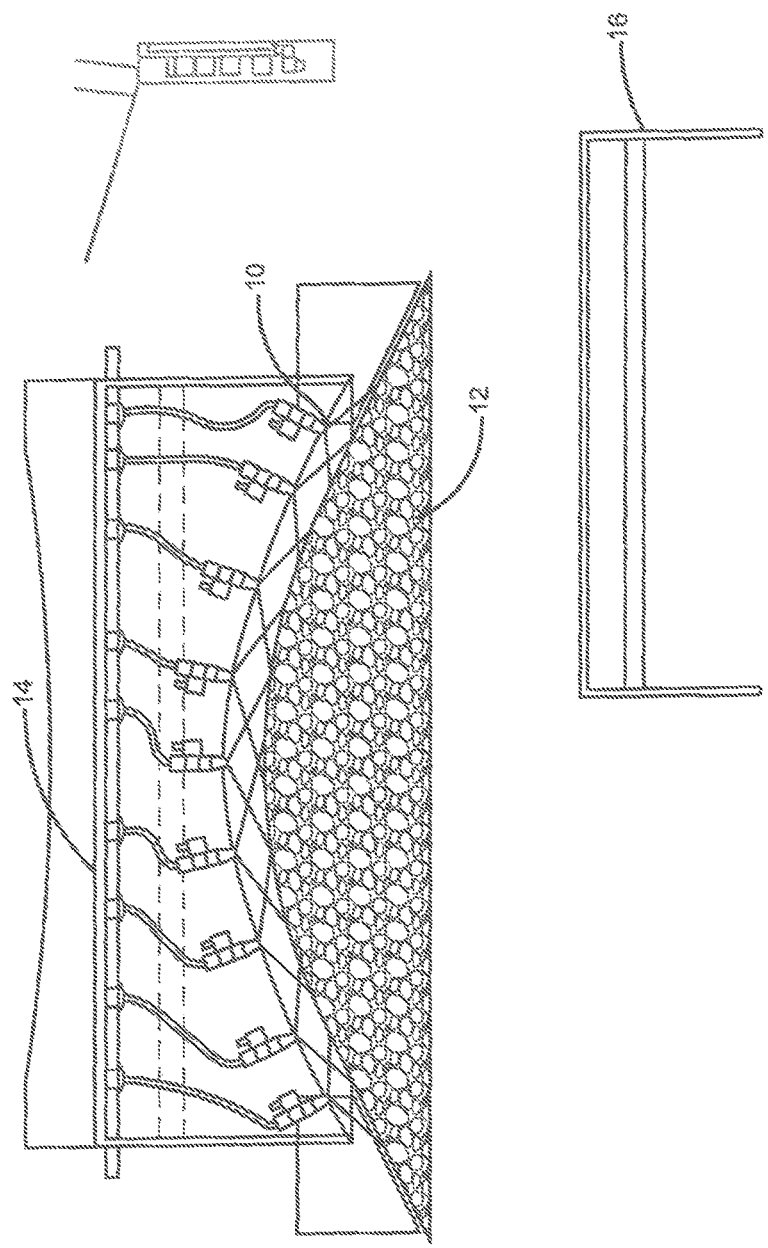
Figure 3:
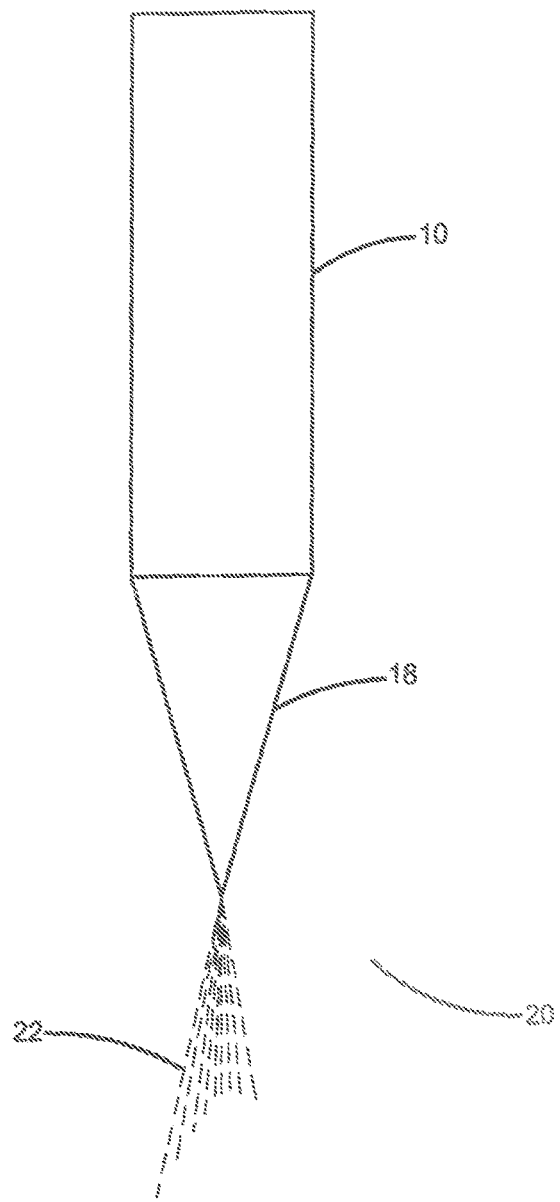
Figure 4:
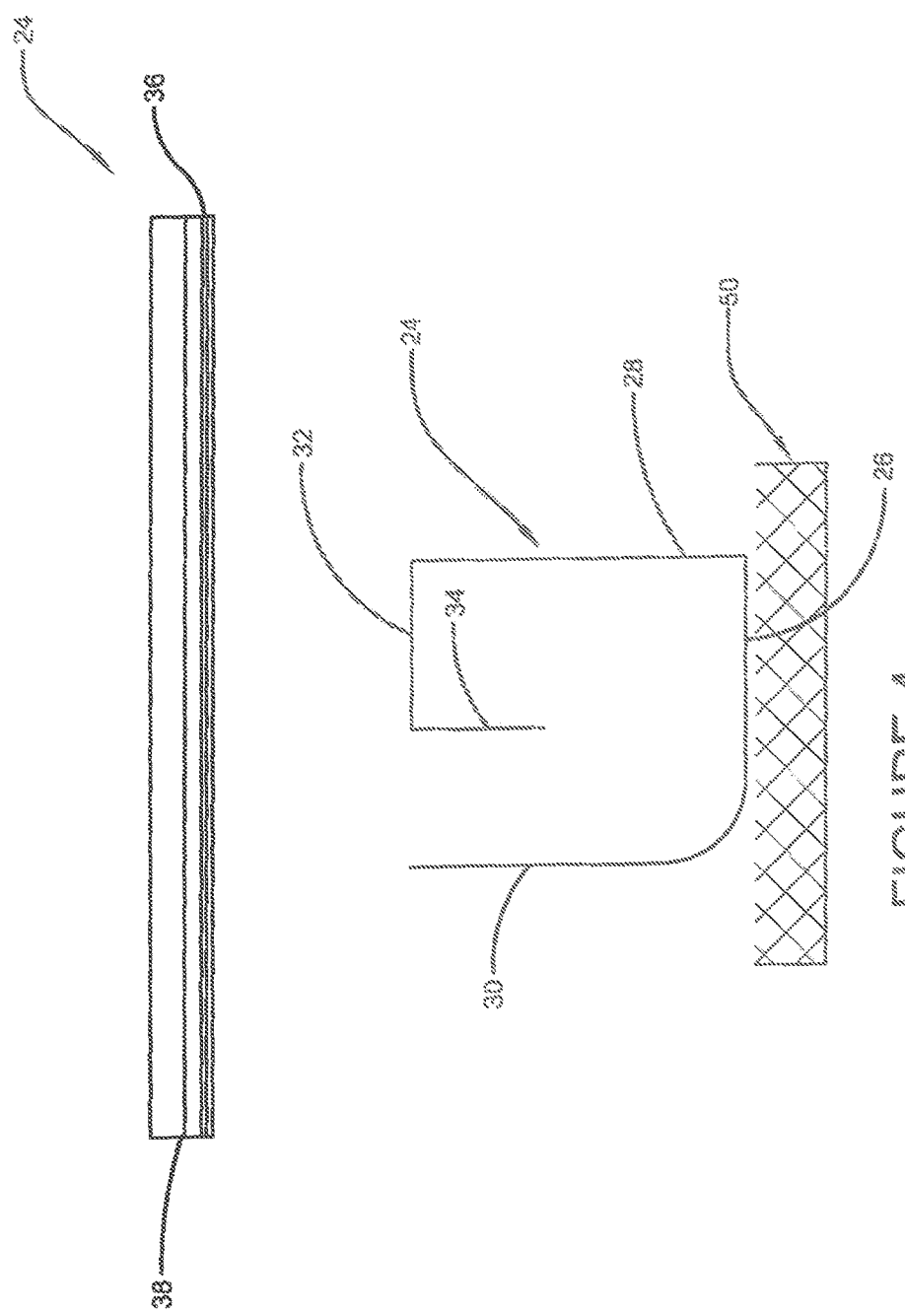
Figure 5:
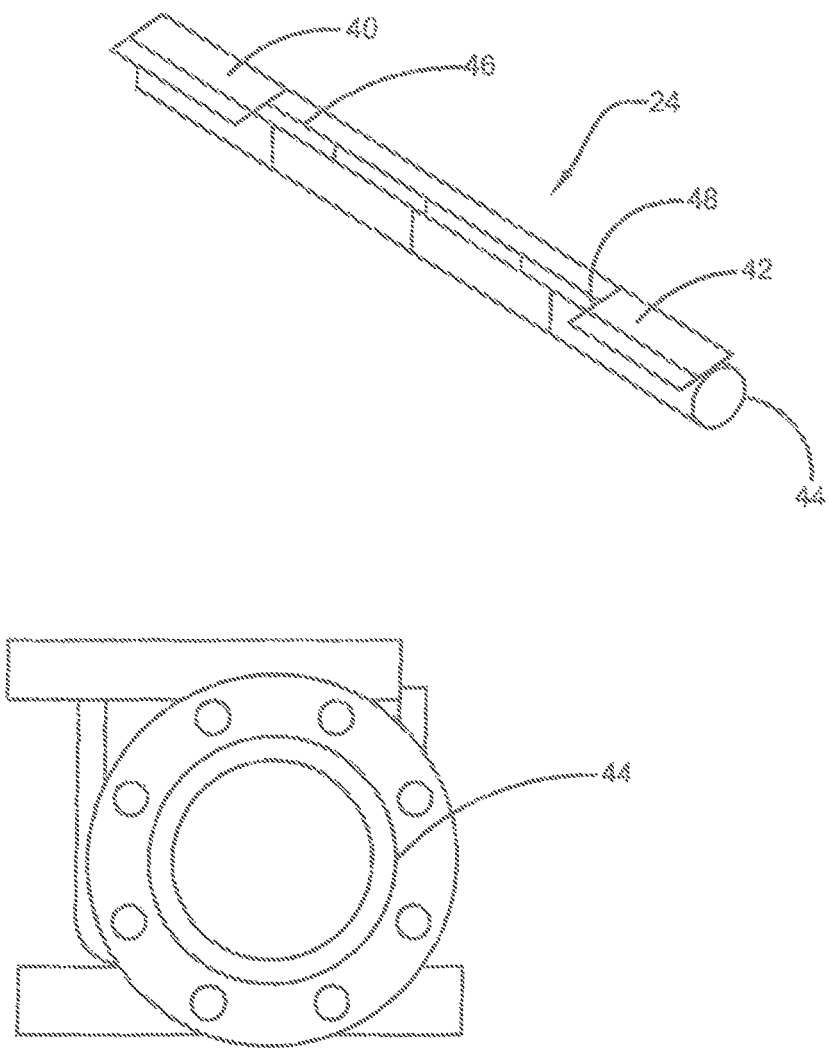
Figure 6:
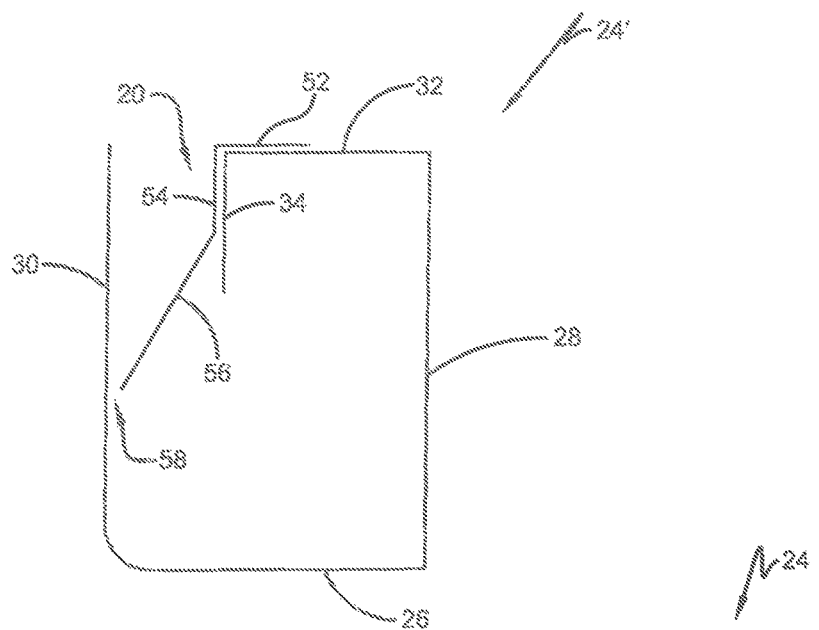
Figure 7:
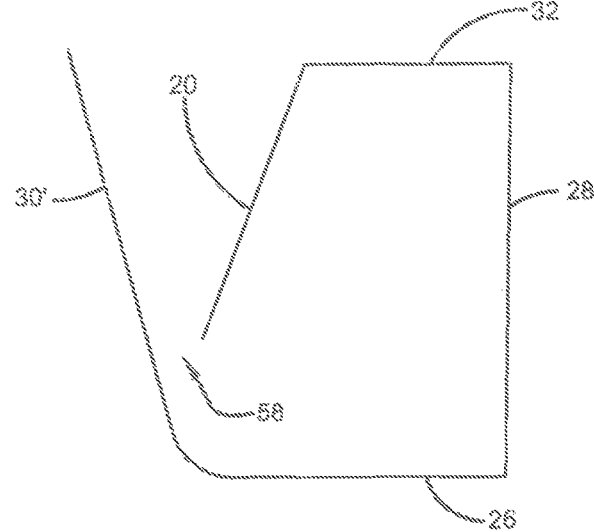

FIG. 1 shows a side view of the spray bar;
FIG. 2 shows a front and side view of the spray bar, as well as the frame;
FIG. 3 shows a perspective view of a spray nozzle and the deflection tray;
FIG. 4 shows several views of a diversion trough;
FIG. 5 shows several views of a stiffener in the diversion trough;
FIG. 6 shows a cross-sectional view of the trough with a deflector; and,
FIG. 7 shows a cross-sectional view of the trough.

IV. DETAILED DESCRIPTION

In reference to the FIGURES, the spray bar 60 has a profile to substantially match the profile of the contents of a railroad car. For example, the railroad car could be carrying coal 12, which needs to be treated so that as little coal dust leaves the railroad car during travel as possible. The spray bar 60 is curved to substantially match the coal profile 12. The spray bar 60 is contained in a housing, and the housing is connected to the trim/profile chute 14 at the silo. With continuing reference to the FIGURES, the spray bar 60 has a straight bar 14, which in one embodiment is made of metal, with an inlet side, quick change brackets (shown, but not referenced) for attachment and removal from the trim chute 14, and connectors (shown, but not referenced) for attachment to the hose (shown, but not referenced).

With continuing reference to the FIGURES, the spray bar 60 has at least one valve (shown, but not referenced) connected to the straight bar 14 via hoses (shown, but not referenced). In one embodiment, the valves (shown, but not referenced) are pneumatic valves, controlled by air pressure, with no use of electricity. Attached to the valves are nozzles 10 for distribution of the chemical. The pneumatic valves allow for precise control of flow, which can be adjustable, and helps prevent dripping. The valves have intake openings and exhaust openings to be controlled by air pressure. The openings are connected with a T-pipe and hose to a pressurized air source. The housing in which the spray bar 60 is contained, in one embodiment, is made of polypropylene for ease of cleaning and for being light weight.

With continuing reference to the FIGURES, the components of the spray bar 60, in one embodiment, are designed to be changed out quickly and efficiently. Also, in at least one embodiment, the housing has flexible extensions which allow for different sized railroad cars.

With continuing reference to the FIGURES, the spray bar 60 is mounted to the trim chute 14 via a frame 16 as shown in FIG. 2. In one embodiment, the frame 16 is a lightweight aluminum frame. The frame 16 is fixedly attached to the chute 14, but the spray bar 60 is removably attached to the frame 16, so that the spray bar 60 may be easily removed for maintenance and cleaning. The spray bar assembly is contained within a housing, and the housing is removably attached to the frame 16. The frame 16 allows for significant support while in operation, and the fact that it is removably attached allows for ease of removal, cleaning, and maintenance. With reference now to FIG. 3, a spray nozzle 10 is shown with a deflection tray 20. The deflection tray 20 is placed beneath the opening 18 of the spray nozzle 10, so that the chemical is deflected off of the tray 20 and in to the trough 24. The deflection of the spray 22 off of the deflection tray 20 reduces spray and waste, as well as reduces foaming of the chemical while the trough 24 is engaged. In one embodiment, the deflection tray 20 is angled at substantially 45 degrees, but any angle that allows for the reduction of foaming can be used.

With reference to FIGS. 4-7, the trough 24 can fill with liquid and foam, where it can flow to one side where gravity feeds the liquid away. The trough 24 has a front portion 30, a back portion 28, a bottom portion 25, a first side portion 36, a second side portion 38, a top plate 32, and a flange 34. The front portion 30 and back portion 28 connect to the bottom portion 26, wherein the front and back portions 30, 28 are substantially parallel to one another. The top plate 32 connects to the back portion as shown in FIG. 4, and the flange 34 extends downwardly from the top plate 32, as shown in FIG. 4. Since the nozzles 10 spray continuously, the trough 24 is engaged to catch the spray 22 when no chemical needs to be applied. The trough 24 catches the spray 22 to avoid having the spray 22 go directly on the ground. An issue with the spray 22 going into the trough 24 is that the spray tends to splash and foam when contacting the bottom portion 26. In one example, the trough 24 can be twelve feet long, the spray is nine feet, which leaves approximately eighteen inches on each side of the trough 24. This space on either side provides space for the foam to gather, which can be held in the trough 24 by cover 40 as shown in FIG. 5. A top cover 40 and a vent insert 46 are provided, with the vent insert 46 being deliberately vented to allow foam to enter, but not escape. In another example, the trough 24 can have a first cover 40 and a second cover 42, wherein the covers 40, 42 cover the approximately eighteen inches on each side of the trough 24. The trough 24 can also have a first vent insert 40 and a second vent insert 42.

Another example provides varying degrees of tilt to the trough 24, so that the foam/liquid is evacuated more quickly, which reduces the amount of foam. The trough 24 can be tilted toward a drain 44, which is connected to one of the side portions 36, 38. The greater the slope, the quicker the foam/liquid will be evacuated from the trough 24. In one example, the trough 24 is tilted toward the drain 44 at least one eighth of an inch per foot. In another example, a collecting tray 50 is provided below the trough 24 to collect any liquid that collects on the face of the trough 24 and drips down. In one embodiment, the tray 50 has an absorbent, porous material to collect liquid and allow evaporation.

With reference to FIG. 6, deflector tray 20 is attached to the trough 24. The deflector tray 20 has a first portion 52, which is attached to the top plate 32, a second portion 54, which is attached to the flange 34, and a third portion 56, which angles outwardly from the flange 34 toward the front portion 30. The deflector tray 20 angles to create a funnel wherein the liquid is directed through a narrow slit 58, which decreases the foam created, and contains the foam. The deflector tray 20 can be angled at between about 15 degrees to about 70 degrees (including, but not limited to 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 45, 47, 48, 49, 50, 51, 52, 53, 54, 55, 56, 57, 58, 59, 60, 61, 62, 63, 64, 65, 66, 67, 68, 69, and 70), and within that range can be between about 30 degrees and about 60 degrees (including, but not limited to 30, 31, 32, 33, 34, 35, 36, 37, 38, 39, 40, 41, 42, 43, 44, 45, 45, 47, 48, 49, 50, 51, 52, 53, 54, 55, 56, 57, 58, 59, and 60), and within that range can be about 45 degrees. The deflector tray 20 can be angled at greater than about 15 degrees, can be angled at less than about 70 degrees, can be angled at greater than about 30 degrees, or can be angled at less than about 60 degrees.

With reference to FIG. 7, in another example, the front portion 30' of the trough 24' is angled outwardly, so that it is closer to being perpendicular to the incoming spray 22, which allows for the cutting off of the spray 22 as it moves into and out of the trough 24. The tilted trough 24' embodiment can be incorporated with any of the above mentioned embodiments as well.

The embodiments have been described, hereinabove. It will be apparent to those skilled in the art that the above methods and apparatuses may incorporate changes and modifications without departing from the general scope of the present teaching. It is intended to include all such modifications and alterations insofar as they come within the scope of the appended claims or the equivalents thereof.

Further examples consistent with the present teachings are set out in the following numbered clauses.

Clauses

1. A spray trough including a trough body, wherein the trough body has a bottom portion, a first side portion, a second side portion, a front portion, and a back portion, the bottom portion, the front portion, and the back portion each having a first end and a second end, wherein the first end of the bottom portion is connected to the first end of the front portion and the second end of the bottom portion is connected to the first end of the back portion; a top plate having a first end and a second end, wherein the first end of the top plate is fixedly attached to the second end of the back portion, wherein the top plate extends substantially perpendicular from the second end of the back portion, wherein the second end of the top plate does not extend to the second end of the front portion; and, a deflector plate, wherein the deflector plate is attached to the second end of the top plate, wherein the deflector plate extends downwardly from the second end of the top plate, such that the deflector plate angles towards the front portion.

2. The spray trough of clause 1, wherein the spray trough further includes a drain, wherein the drain is located on either the first side portion or the second side portion.

3. The spray trough of clauses 1 or 2, wherein the front portion is substantially perpendicular to the bottom portion.

4. The spray trough of clauses 1 or 2, wherein the front portion extends outwardly at an angle from the bottom portion.

5. The spray trough of clauses 1-4, wherein the deflector plate has an angle of between about 15 degrees and about 70 degrees.

6. The spray trough of clauses 1-5, wherein the deflector plate has an angle of between about 30 degrees and about 60 degrees.

7. The spray trough of clauses 1-6, wherein the deflector plate has an angle of about 45 degrees.

8. The spray trough of clauses 1-7, wherein the trough further includes a flange, wherein the flange is connected to the second end of the top plate and extends perpendicularly downward from the second end of the top plate, wherein the deflector plate has a first portion, a second portion, and a third portion, wherein the first portion is attached to and parallel with the top plate, the second portion is attached to and parallel with the flange, and the third portion is angled away from the flange and the top plate toward the front portion.

9. The spray trough of clauses 2-8, wherein the bottom portion is sloped toward the drain.

10. The spray trough of clauses 2-9, wherein the bottom portion is sloped at least one eighth of an inch per foot.

11. A spray trough including a trough body, wherein the trough body has a bottom portion, a first side portion, a second side portion, a front portion, and a back portion, the bottom portion, the front portion, and the back portion each having a first end and a second end, wherein the first end of the bottom portion is connected to the first end of the front portion and the second end of the bottom portion is connected to the first end of the back portion; at least one cover, wherein the at least one cover attaches to the second end of the front portion and the second end of the back portion, wherein the at least one cover is not as long as the trough body, wherein the at least one cover has a first end and a second end; and, at least one vent insert, wherein the vent insert is connected to the second end of the at least one cover and the bottom portion, wherein the vent insert is vented.

12. The spray trough of clause 11, wherein the at least one cover is a first cover and a second cover, wherein the first cover attaches to the second end of the front portion, the second end of the back portion, and the first side portion, wherein the first cover is not as long as the trough body, wherein the first cover has a first end and a second end, wherein the second cover attaches to the second end of the front portion, the second end of the back portion, and the second side portion, wherein the second cover is not as long as the trough body, wherein the second cover has a first end and a second end.

13. The spray trough of clauses 11 or 12, wherein the at least one vent insert is a first vent insert and a second vent insert, wherein the first vent insert is connected to the second end of the first cover and the bottom portion, wherein the first vent insert is vented, wherein the second vent insert is connected to the second end of the second cover and the bottom portion, wherein the second vent insert is vented.

14. The spray trough of clauses 11-13, wherein the spray trough further includes a drain, wherein the drain is located on either the first side portion or the second side portion.

15. The spray trough of clauses 11-14, wherein the bottom portion is sloped toward the drain.

16. The spray trough of clauses 11-15, wherein the bottom portion is sloped at least one eighth of an inch per foot.

I claim:

1. A spray trough system comprising:
   a trough body, wherein the trough body has a bottom portion, a first side portion, a second side portion, a front portion, and a back portion, the bottom portion, the front portion, and the back portion each having a first end and a second end, wherein the first end of the bottom portion is directly connected to the first end of the front portion and the second end of the bottom portion is directly connected to the first end of the back portion;
   a top plate having a first end and a second end, wherein the first end of the top plate is fixedly attached to the second end of the back portion, wherein the top plate extends substantially perpendicular from the second end of the back portion, wherein the second end of the top plate does not extend to the second end of the front portion;
   a deflector tray, wherein the deflector tray is attached to the second end of the top plate, wherein the deflector tray extends downwardly from the second end of the top plate, such that the deflector tray angles towards the front portion, wherein an angled portion of the deflector tray is below the second end of the front portion;
   At least one spray nozzle; and,
   wherein the spray trough body is configured to receive downward spray from the at least one spray nozzle located above the spray trough body.

2. The spray trough of claim 1, wherein the spray trough further comprises:
   a drain, wherein the drain is located on either the first side portion or the second side portion.

3. The spray trough of claim 1, wherein the front portion is substantially perpendicular to the bottom portion.

4. The spray trough of claim 1, wherein the front portion extends outwardly at an angle from the bottom portion.

5. The spray trough of claim 1, wherein the deflector plate has an angle of between about 15 degrees and about 70 degrees.

6. The spray trough of claim 5, wherein the deflector plate has an angle of between about 30 degrees and about 60 degrees.

7. The spray trough of claim 6, wherein the deflector plate has an angle of about 45 degrees.

8. The spray trough of claim 1, wherein the trough further comprises:
   a flange, wherein the flange is connected to the second end of the top plate and extends perpendicularly downward from the second end of the top plate, wherein the deflector plate has a first portion, a second portion, and a third portion, wherein the first portion is attached to and parallel with the top plate, the second portion is attached to and parallel with the flange, and the third portion is angled away from the flange and the top plate toward the front portion.

9. The spray trough of claim 2, wherein the bottom portion is sloped toward the drain.

10. The spray trough of claim 9, wherein the bottom portion is sloped at least one eighth of an inch per foot.

* * * * *